US011416251B2

(12) United States Patent
Ellis et al.

(10) Patent No.: US 11,416,251 B2
(45) Date of Patent: Aug. 16, 2022

(54) APPARATUS FOR STORING, READING AND MODIFYING CONSTANT VALUES

(71) Applicant: Arm Limited, Cambridge (GB)

(72) Inventors: Sean Tristram LeGuay Ellis, Farnham (GB); Andrew James Booker, Ely (GB)

(73) Assignee: Arm Limited, Cambridge (GB)

( * ) Notice: Subject to any disclaimer, the term of this patent is extended or adjusted under 35 U.S.C. 154(b) by 273 days.

(21) Appl. No.: 15/814,675

(22) Filed: Nov. 16, 2017

(65) Prior Publication Data

US 2019/0146797 A1    May 16, 2019

(51) Int. Cl.
  *G06F 9/30*    (2018.01)
  *G06F 7/57*    (2006.01)
  *G06F 9/455*   (2018.01)
  *G06F 9/38*    (2018.01)

(52) U.S. Cl.
  CPC ............ *G06F 9/30181* (2013.01); *G06F 7/57* (2013.01); *G06F 9/3001* (2013.01); *G06F 9/3012* (2013.01); *G06F 9/30029* (2013.01); *G06F 9/30145* (2013.01); *G06F 9/30167* (2013.01); *G06F 9/3893* (2013.01); *G06F 9/45533* (2013.01); *G06F 9/45558* (2013.01)

(58) Field of Classification Search
  CPC ............................ G06F 9/30167; G06F 9/3893
  See application file for complete search history.

(56) References Cited

U.S. PATENT DOCUMENTS

| 5,442,577 | A | * | 8/1995 | Cohen | G06F 7/575 326/37 |
| 5,819,306 | A | * | 10/1998 | Goldman | G06F 9/466 711/100 |
| 6,338,132 | B1 | * | 1/2002 | Kyker | G06F 9/30156 712/211 |
| 2005/0125637 | A1 | * | 6/2005 | Dijkstra | G06F 9/30025 712/221 |
| 2006/0026400 | A1 | * | 2/2006 | Chauvel | G06F 9/30174 712/226 |
| 2007/0110053 | A1 | * | 5/2007 | Soni | H04L 63/0263 370/389 |
| 2016/0077836 | A1 | * | 3/2016 | Morrow | G06F 9/3861 712/227 |

(Continued)

OTHER PUBLICATIONS

R. Bedichek, "Some Efficient Architecture Simulation Techniques" Winter 1990 USENIX Conference, Jan. 1990, 12 pages.

*Primary Examiner* — Jacob Petranek
(74) *Attorney, Agent, or Firm* — Nixon & Vanderhye P.C.

(57) ABSTRACT

A data processing system utilizes non-volatile storage to store constant values. An instruction decoder decodes program instructions to generate control signals to control processing circuitry to perform processing operations which may include processing operations corresponding to constant-using program instructions. Such constant-using program instructions may include one or more operation specifying fields and one or more argument specifying fields which control the processing circuitry to generate an output value equal to that given by reading one or more constant values from the non-volatile storage, optionally modifying such a value, and then performing the processing operation upon the value, or the modified value, to generate an output value.

16 Claims, 9 Drawing Sheets

(56) References Cited

U.S. PATENT DOCUMENTS

2017/0093986 A1* 3/2017 Kim .................. H04L 49/00
2017/0315811 A1* 11/2017 Kwon ............. G06F 9/30087
2017/0337156 A1* 11/2017 Yadavalli ........... G06F 9/3001

* cited by examiner

APPARATUS FOR STORING, READING AND MODIFYING CONSTANT VALUES

BACKGROUND

Technical Field

This disclosure relates to the field of data processing systems. More particularly, this disclosure relates to techniques for supplying constant values for use in data processing operations.

Technical Background

It is known to provide data processing systems to perform processing operations specified by program instructions. These program instructions may use one or more input arguments in dependence upon which an output value is generated. Depending upon the processing to be performed, the input arguments may be variables which are dynamically calculated, such as, in dependence upon previous processing, or may be constant values (immediate values). For example, if it is desired to calculate the circumference of a circle, then this may be done by multiplying the radius of the circle concerned, specified with a variable input argument, by the value of $\pi$, specified by a constant value.

SUMMARY

At least some embodiments of the present disclosure provide apparatus for processing data comprising:
non-volatile storage to store one or more constant values;
processing circuitry to perform processing operations specified by program instructions; and
an instruction decoder to decode said program instructions to generate control signals to control said processing circuitry to perform said processing operations; wherein
said instruction decoder is responsive to a constant-using program instruction having one or more operation specifying fields specifying a processing operation and one or more argument specifying fields specifying one or more input arguments to said processing operation to generate control signals to control said processing circuitry to generate an output value equal to that given by the steps of:
reading one or more constant values from said non-volatile storage;
modifying said one or more constant values using one or more modification operations at least partially specified by said one or more argument specifying fields to form one or more modified constant values; and
performing said processing operation using said one or more modified constant values as one or more of said one or more input arguments to generate said output value.

At least some embodiments of the present disclosure provide apparatus for processing data comprising:
non-volatile storage means for storing one or more constant values;
processing means for performing processing operations specified by program instructions; and
instruction decoding means for decoding said program instructions to generate control signals to control said processing means to perform said processing operations; wherein
said instruction decoding means is responsive to a constant-using program instruction having one or more operation specifying fields specifying a processing operation and one or more argument specifying fields specifying one or more input arguments to said processing operation to generate control signals to control said processing means to generate an output value equal to that given by the steps of:
reading one or more constant values from said non-volatile storage means;
modifying said one or more constant values using one or more modification operations at least partially specified by said one or more argument specifying fields to form one or more modified constant values; and
performing said processing operation using said one or more modified constant values as one or more of said one or more input arguments to generate said output value.

At least some embodiments of the present disclosure provide a method of processing data comprising the steps of:
storing one or more constant values within non-volatile storage;
performing processing operations specified by program instructions using processing circuitry; and
decoding said program instructions to generate control signals to control said processing circuitry to perform said processing operations; wherein
in response to a constant-using program instruction having one or more operation specifying fields specifying a processing operation and one or more argument specifying fields specifying one or more input arguments to said processing operation, generating control signals to control said processing circuitry to generate an output value equal to that given by the steps of:
reading one or more constant values from said non-volatile storage means;
modifying said one or more constant values using one or more modification operations at least partially specified by said one or more argument specifying fields to form one or more modified constant values; and
performing said processing operation using said one or more modified constant values as one or more of said one or more input arguments to generate said output value.

At least some embodiments of the present disclosure provide a method of compiling program instructions to be executed by a target processing apparatus comprising the steps of:
identifying an input argument of a processing operation that is a constant value;
determining if said constant value can be provided as a storage-sourced constant value by one of:
a constant value stored within non-volatile storage of said target processing apparatus; and
a constant value stored within said non-volatile storage and subject to one of a plurality of predetermined modification operations supported by modifying circuitry of said target processing apparatus; and
when constant value can be provided as a storage-sourced constant value, including within said program instructions one or more program instructions using said storage-sourced constant value as said input argument.

At least some embodiments of the present disclosure provide a method of disassembling program instructions to be executed by a target processing apparatus comprising the steps of:
identifying a program instruction using as an input argument a constant value provided as a storage-sourced constant value by one of:
a constant value stored within non-volatile storage of said target processing apparatus; and a constant value stored within said non-volatile storage and subject to one of a plurality of predetermined modification operations supported by modifying circuitry of said target processing apparatus; and when constant value is provided as a storage-sourced constant value, dissembling said program instruction to a form specifying said storage-sourced constant value as an immediate value.

Another form of the present disclosure may be that of a virtual machine provided by a virtual machine computer program executed with a general purpose computer and providing an execution environment in accordance with the above described apparatus and methods.

Further aspects, features and advantages of the present technique will be apparent from the following description of examples, which is to be read in conjunction with the accompanying drawings.

DESCRIPTION OF EXAMPLES

Figure 1:
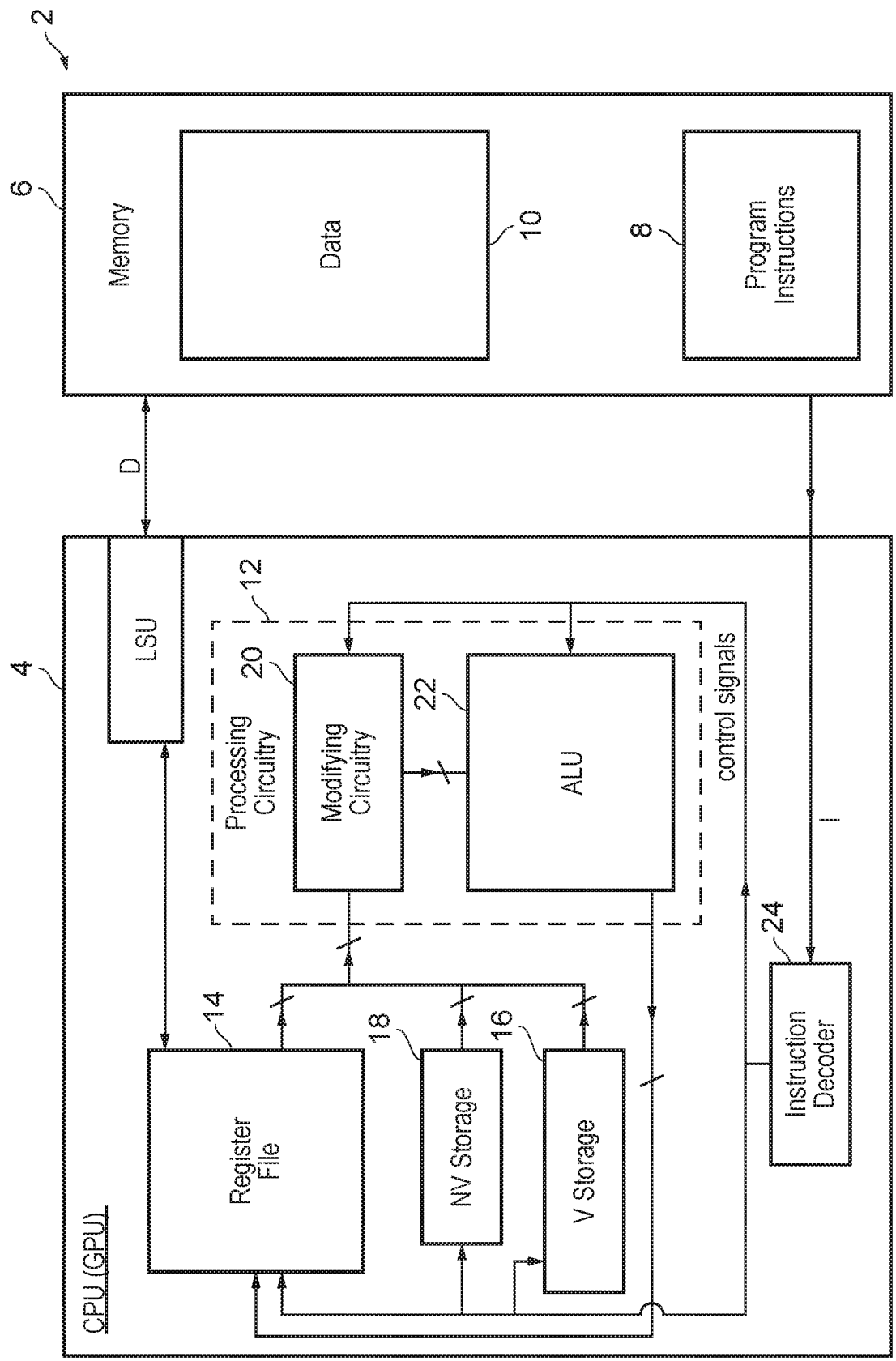
FIG. 1 schematically illustrates a processor for performing processing operations using variable input operands and constant value input operands.

FIG. 1 schematically illustrates a data processing system 2 including a general purpose processor 4 coupled to a memory 6. It will be appreciated that while this example shows a general purpose processor 4, other example embodiments using the present techniques include a graphics processing unit (GPU), which may utilise constant values as input arguments to processing operations which it performs.

The memory 6 stores program instructions 8 specifying processing operations to be performed and data 10 comprising data values to be manipulated (e.g. inputs or outputs) by the execution of the program instructions.

The processor 4 comprises processing circuitry 12 which receives input arguments from any one or more of a register file 14 storing register values, volatile storage 16 (such as a tightly coupled RAM) storing variable values, and non-volatile storage 18 (such as a tightly coupled ROM) storing constant values. The processing circuitry 12 includes modifying circuitry 20 which may selectively apply one or more modifying operations upon input arguments supplied from any of the register file 14, the volatile storage 16 and the non-volatile storage 18 to generate modified values.

These modified values are supplied to an arithmetic and logic unit 22 which performs a processing operation such as an arithmetic operation (e.g. add, subtracts, multiply, etc) or a logic operation (AND, OR, XOR, etc) upon the modified input arguments to generate an output value which is returned to the register file 14 as one of the register values stored by that register file 14. The processing circuitry 12 may receive multiple input arguments in parallel as required by a particular processing operation corresponding to a program instruction being executed. These different input arguments may be supplied by differing combinations of the register file 14, the volatile storage 16 and the non volatile storage 18 as specified by the program instruction using one or more argument specifying fields within the program instruction.

The program instruction also includes one or more operation specifying fields specifying the processing operation to be performed. A modification operation to be performed by the modifying circuitry 20 can be, for example, specified in its own special purpose modification operation field, or may be specified by bits within the argument specifying fields possibly in combination with information determined from decoding the operation specifying fields as will be described later.

The program instructions 8 stored within the memory 6 are supplied to an instruction decoder 24 within the processor 4. The instruction decoder 24 decodes the received program instructions and generates control signals which are supplied to different portions of the processor 4 to control those different portions to perform processing operations corresponding to those specified by the decoded program instruction. The decoded program instructions may include constant-using program instructions for which at least one of the input arguments is a constant value to be taken from, or derived from, a value read from the non-volatile storage 18. As an example, the constant-using program instruction may be a multiply instruction in which one input argument is a variable value taken from a register value stored within the register file 14 and the other input argument is a constant value (such as a value of π as previously discussed) read from the non-volatile storage 18. The output value generated as a result of such a multiplication is written back as a register value into the register file 14. It will be appreciated that such a multiplication is only one example of a constant-using program instructions and many other different forms of constant-using program instructions such as additions, subtractions, logical combinations, etc. may be provided by example embodiments of the present disclosure depending upon the capabilities of the arithmetic logic unit 22.

It will be seen from FIG. 1 that the modifying circuitry 20 lies in the data path of the input arguments irrespective of whether these are read from the register file 14, the volatile storage 16 or the non-volatile storage 18. Accordingly, the modifying circuitry 20 is able to perform modification operations upon input arguments irrespective of their source and there is no requirement to provide special purpose modification circuitry 20 dedicated to constant values read from the non-volatile storage 18 as such modification circuitry 20 may already be provided to perform modification operations upon input arguments read from the register file 14 and/or the volatile storage 16.

As previously discussed, the modification operations to be performed may be at least partially specified by one of more of the operation specifying fields (opcodes) of a program instruction to be executed. Such operation specifying fields may, for example, specify a numeric type of the one or more arguments among a plurality of numeric types. As an example, some operation specifying fields may specify an integer processing operation performed upon input arguments with a numeric type corresponding to an integer value whereas different program instructions may have operation specifying fields specifying a floating point processing operation to be performed upon input arguments having a numeric type corresponding to a floating point variable. The modification operations appropriate to these different numeric types may differ. As an example, byte section within a word-length integer value may be appropriate in some circumstances whereas byte selection has no real meaning within floating point operations which comprise a signed bit, an exponent value and a mantissa value rather than separate bytes. In recognition of the above, instruction encoding bit space may be reduced by encoding a manipulation to be performed using a combination of the operation specifying fields and the input argument specifying fields of a program instruction. Examples of different numeric types of arguments include integer arguments, floating point arguments, byte length arguments, half word length arguments and full word length arguments. The manipulation operations supported for these different types of arguments may differ.

FIG. 1 schematically illustrates the modifying circuitry 20 as being discrete (separate from) the arithmetic logic circuitry 22. In other example embodiments, the modifying circuitry 20 may be fused with the arithmetic logic circuitry 22 such that the one or more modification operations and the processing operations are performed as a fused operation. For example, if the logical design of the data processing system 2 illustrated in FIG. 1 is subject to synthesis by integrated circuit synthesis tools, then such synthesis tools are likely to fuse together the modifying circuitry 20 and the arithmetic and logic circuitry 22 as part of their normal operation in optimising the circuit design and layout.

The modification operation supported by the modifying circuitry 20 can take a wide variety of different forms. Examples of such modification operations which may be performed upon constant values read from the non-volatile storage 18 to generate modified constant values include byte selection from within a constant value, half word selection from within a constant value, widening of a selected portion of a constant value, sign reversal of a constant value, taking an absolute value of a constant value, and performing a swizzle operation upon one or more selected portions of a constant value (e.g. rearranging (and possibly copying) the elements of a vector given by the constant value).

Figure 2:
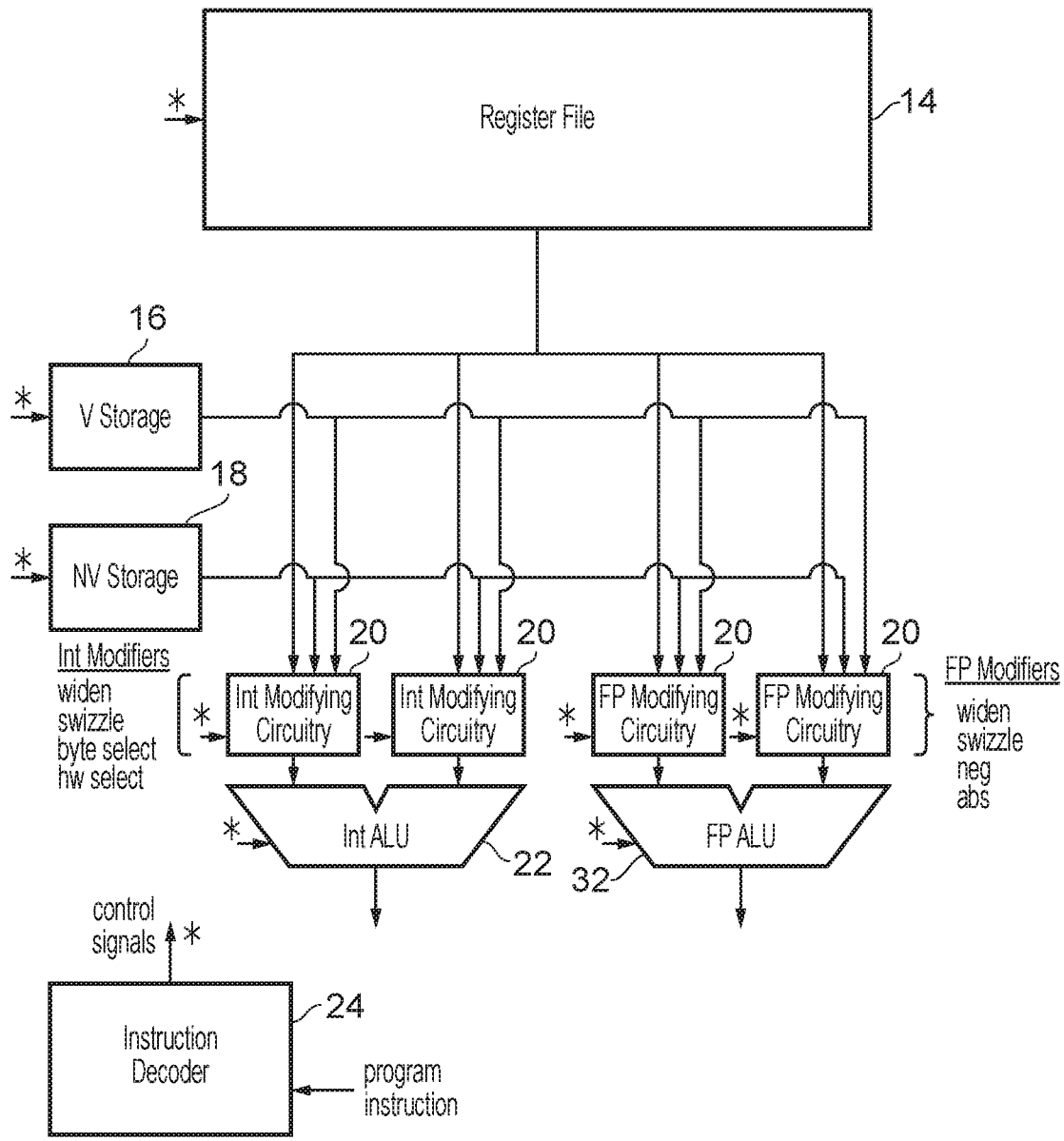
FIG. 2 schematically illustrates different sources of input operands to processing circuitry for performing processing operations.

FIG. 2 schematically illustrates the data processing path of the data processing system of FIG. 1. FIG. 2 shows the arithmetic logic unit split into separate data paths depending upon the numeric type of the processing operation being performed, e.g. whether the processing operation is integer processing operation or a floating point processing operation. In this example, the arithmetic logic units 22 each may receive up to two input arguments, which are supplied to them via respective integer modifying circuitry 20 and floating point modifying circuitry 20. The integer modifying circuitry 20 may provide modification operations including operations which widen, swizzle, byte select and half word select from among integer full word length input arguments. The floating point modifying circuitry 20 may provide modification operations to floating point input arguments which include widening, swizzle operations, sign reversal, and determination of the absolute value. The instruction decoder 24 decodes the program instruction specifying the program instruction operation to be performed and generates control signals, indicated by "★" within FIG. 2, which are supplied to the different portions of the data path illustrated in FIG. 2 to control these to perform the processing operation specified by the program instruction that has been decoded. The input arguments may be read from any one of or a combination of the register file 14, the volatile storage 16, and/or the non-volatile storage 18.

Figure 3:
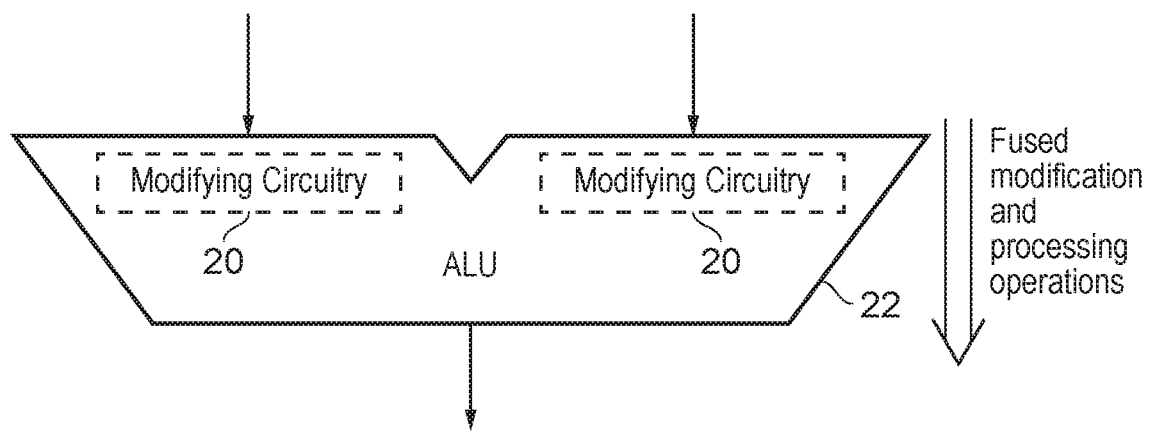
FIG. 3 schematically illustrates fused modifying, arithmetic and logic circuitry.

As previously mentioned, the modifying circuitry 20 and the arithmetic logic circuitry 22 may be provided as discrete circuitry as is illustrated in FIG. 2. In alternative embodiments, the modification circuitry 20 and the arithmetic logic circuitry 22 may be fused together as is illustrated in FIG. 3 so as to provide fused modification and processing operations whereby the modification of the input arguments takes place as an integral part of the performing of the processing operation, e.g. a sign reversal of an input argument may be achieved by a sign bit reversal embedded within the processing performed by the arithmetic logic unit as part of the processing operation.

Figure 4:
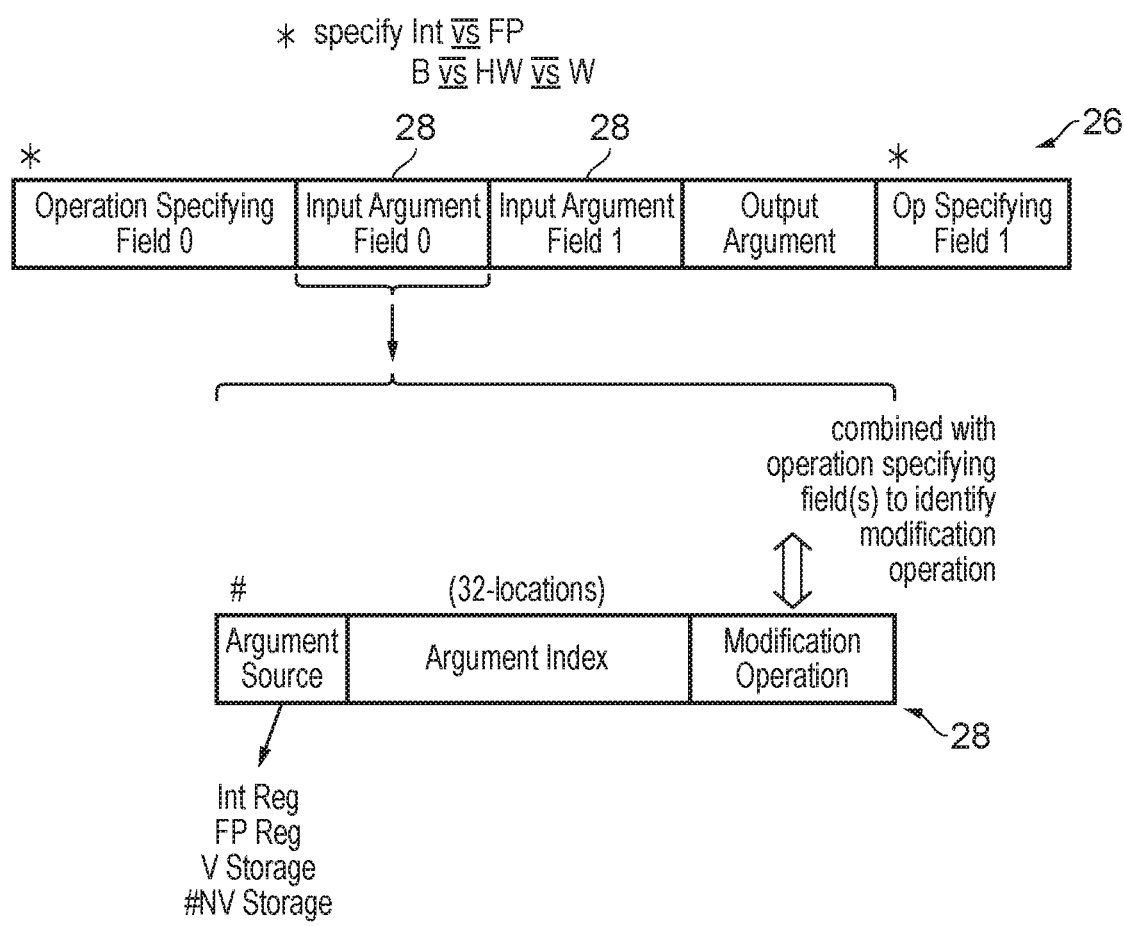
FIG. 4 schematically illustrates a program instruction including operation specifying fields and input argument specifying fields.

FIG. 4 schematically illustrates a program instruction 26 specifying both a processing operation to be performed and input and output arguments. In this example, the program instruction 26 includes two operation specifying fields, two input argument specifying fields and an output argument specifying field. The operation specifying fields together specify the processing operation to be performed, including the numeric type of the input arguments and output argument, such as whether these are integer or floating point arguments, whether they are byte, half word or word integer arguments, the precision of a floating point argument, whether they are signed or unsigned integers, etc. The input argument specifying fields 28 as illustrated may themselves be broken down to sub-fields which can specify an argument source (e.g. an integer register file, a floating point register file, the volatile storage 16, or the non-volatile storage 18). A further subfield within the argument specifying field 28 may include an argument index providing, for example, a storage location within the non-volatile storage 18 storing a constant value to be used either directly, or in modified form, by a constant-using program instruction.

The input argument specifying field 28 may further include, as illustrated, a subfield specifying a modification operation to be performed upon the input argument, such as a constant value read from the non-volatile storage 18. This modification operation may be specified in combination with the operation specifying fields of the full program instruction. The modification operations may include, for example, byte selection from within a constant value, half word selection from within a constant value, widening of selected portion of a constant value, signed reversal of a constant value, taking an absolute value of a constant value, and performing a swizzle operation upon one or more selected portions of the constant value.

Figure 5:
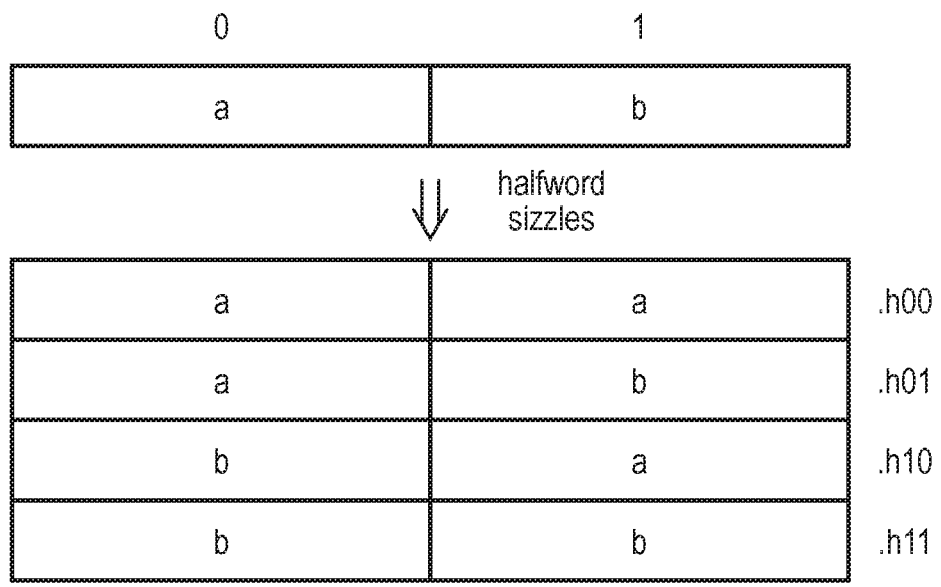
FIGS. 5 and 6 schematically illustrate modification operations in the form of swizzles.
Figure 6:
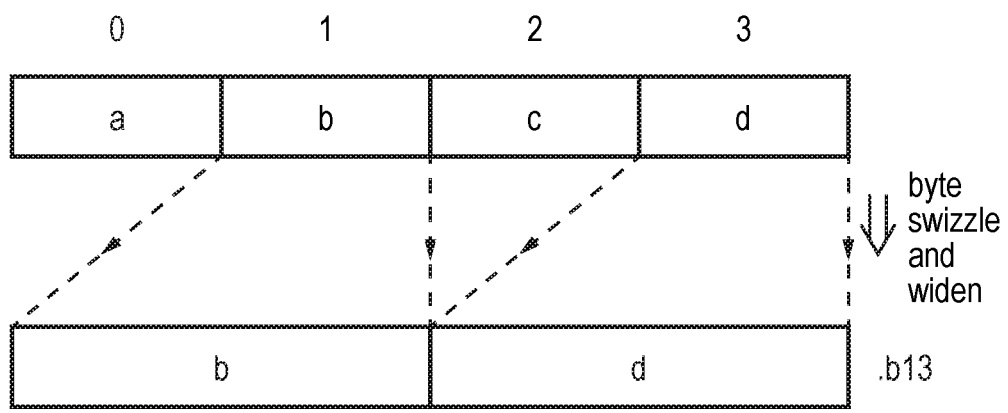

FIGS. 5 and 6 schematically illustrate example modification operations in the form of swizzle operations. FIG. 5 schematically illustrates half word swizzles in which the sources of half word values to be placed in respective half word portions of an output value are independently selected from the half word portions of an input argument. Thus, if an input argument has half word portions (a) and (b), then these input argument half word portions may be selected and placed in the respective half word portions of the output values in dependence upon the specified modification operation.

FIG. 6 schematically illustrates a combined byte swizzle and widen modification operation. In this modification operation, four bytes a, b, c, d of an input argument may be independently selected to be the source of a widened half word to be formed in respective portions of an output value.

Thus, in the example illustrated, the byte from byte position "1" and byte position "3" are respectively selected to be widened and form the first and second half word portions of the output value.

It will be appreciated that FIGS. 5 and 6 are only examples of the modification operations which may be performed upon the input arguments read from the non-volatile storage 18.

Figure 7:
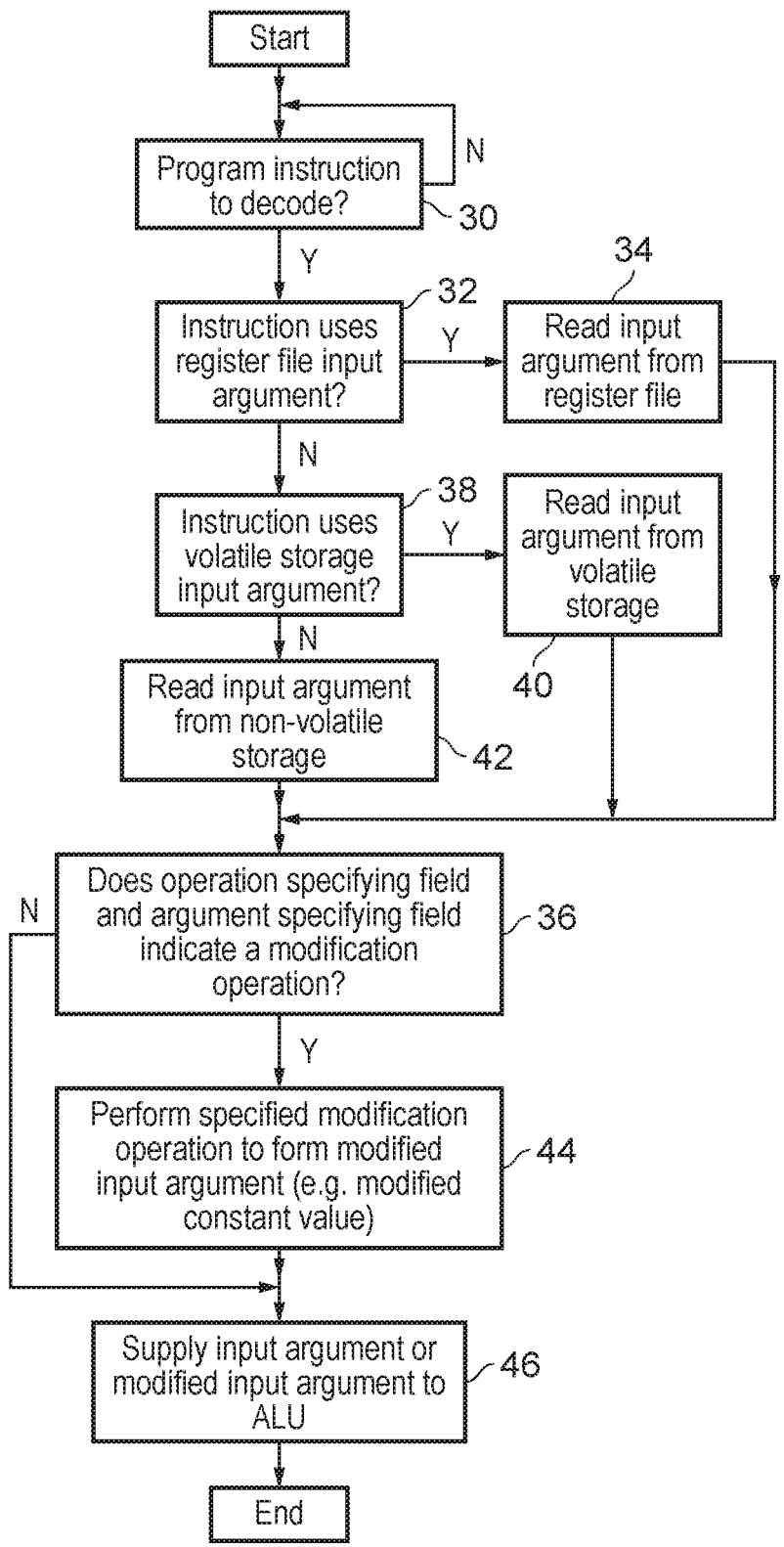
FIG. 7 is a flow diagram schematically illustrating the provision of an input argument for a processing operation.

FIG. 7 is a flow diagram schematically illustrating decoding of program instruction. At step 30 processing waits until a program instruction to decode is received. Step 32 determines whether that instruction uses a register file input argument. If the instruction does use a register file input argument, then this is read from the register file 14 at step 34 and processing proceeds to step 36. If the determination at step 32 is that the instruction does not use a register file input, then processing proceeds to step 38 at which a determination is made as to whether or not the instruction uses an input argument stored within volatile storage 16. If the instruction uses such an input argument stored within volatile storage 16, then this is read at step 40 before processing again proceeds to step 36. If the input argument to be decoded is not drawn from the register file 14 or the volatile storage 16, then it is read from the non-volatile storage 18 at step 42. It will be appreciated that steps 32, 38 and 42 relate to the decoding of the source of a single input argument of a processing operation to be performed and in practice multiple such decoding/selection operations may take place in parallel depending upon the number of input arguments to the processing operation.

Step 36 determines whether or not the operation specifying field and argument specifying field of the program instruction being decoded together indicate that a modification operation is to be performed upon the input argument which has been read. If such a modification is to be performed, then step 44 applies this modification operation to form a modified input argument, such as a modified constant value. If no modification is to be performed as determined at step 36, then step 44 is bypassed. Step 46 serves to supply the input argument or the modified input argument to the arithmetic logic unit 22 where the processing operation as specified by the program instruction is performed.

Figure 8:
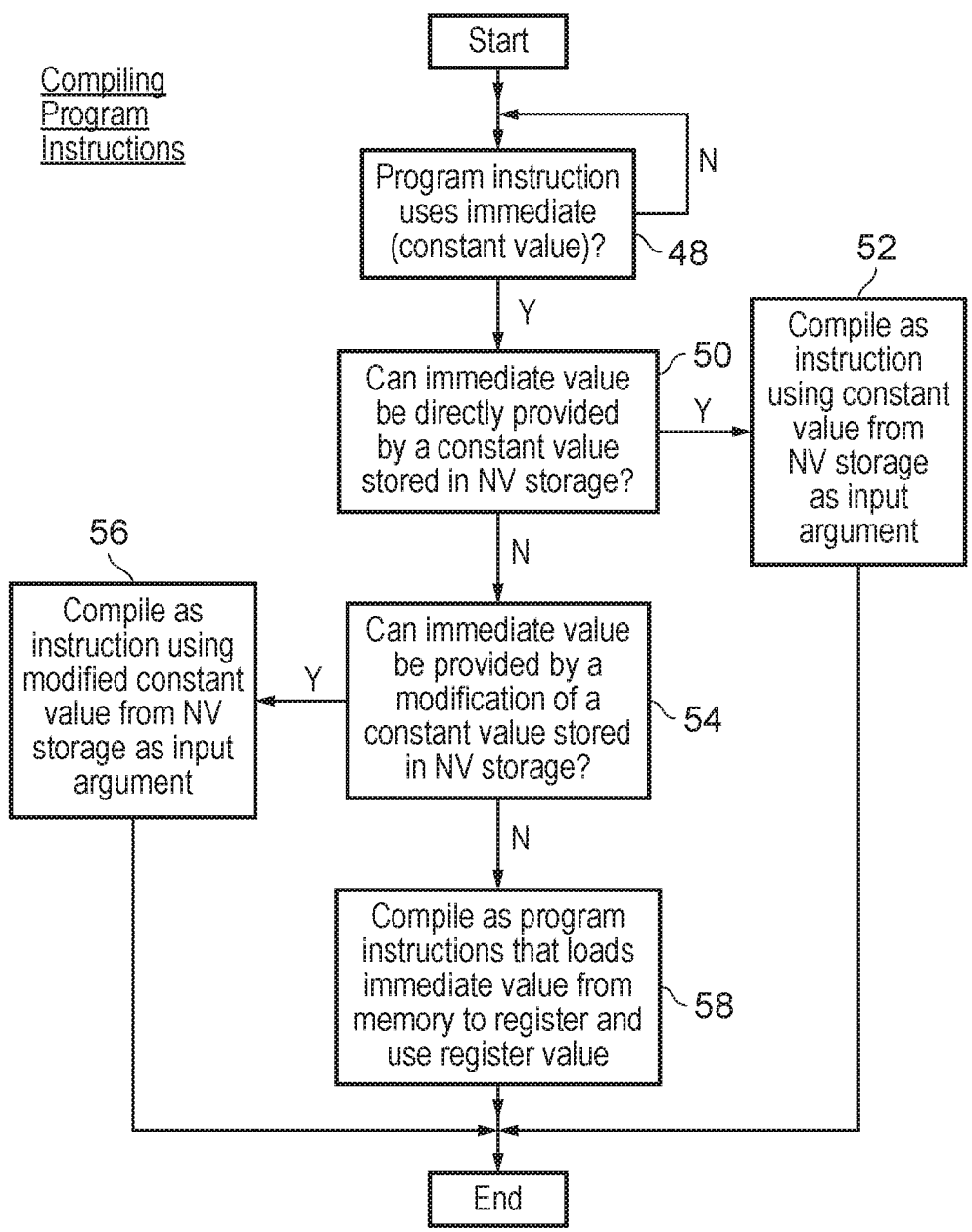
FIG. 8 is a flow diagram schematically illustrating the compiling of program instructions.

It will be appreciated that in using the present techniques whereby constant values read from non-volatile storage 18, and modified versions of those constant values, may be used as input arguments, a compiler compiling program instructions from a computer program written in a higher level computer language should identify opportunities for utilising the constant values stored within the non-volatile storage 18. FIG. 8 is a flow diagram schematically illustrating a portion of the process involved in compiling program instructions to utilise constant values and modified constant values in the case of constant-using program instructions as part of the compiled output of program instructions. Step 48 determines whether a program instruction (or a combination of program instructions) to be compiled from a higher level language uses an immediate value (constant value). If the use of such a constant value is identified at step 48, then step 50 determines whether that constant value can be directly provided by a constant value stored within the non-volatile storage 18. Examples of such a constant value which may be directly provided are constant values of 0, π, log 2, etc. If step 50 determines such an immediate value can be directly provided from a stored constant value, then step 52 compiles the instruction using such a constant value directly read from the non-volatile storage 18, i.e. the non-volatile storage 18 is encoded as the source of the input argument for that immediate value including specifying the index into the non-volatile storage required to read the constant value and that no modification operation is to be performed upon that constant value.

If the determination at step 50 is that the immediate value cannot be directly provided by a constant value stored within the non-volatile storage 18, then step 54 seeks to determine whether the immediate value concerned can be provided by a modification of a constant value stored within the non-volatile storage 18. In practice this may be achieved by searching through a statically or dynamically provided list of the constant values which may be provided by modification operations performed upon the constant values stored within the non-volatile storage 18 to determine if there is any match. Thus, each entry within the non-volatile storage 18 serves as a source both directly and indirectly of constant values which may be used as immediate values. The usefulness of a particular entry within the non-volatile storage 18 may thus be considered to be the sum of the usefulness of the constant value itself and all the constant values which may be derived therefrom by the supported modification operations provided by the modification circuitry 20.

If the determination at step 54 is that the immediate value can be provided by a modification operation performed on a stored constant value within the non-volatile storage 18, then step 56 serves to compile the instruction(s) using a modified constant value read from a specified index position within the non-volatile storage 18 and subject to a specified modification operation as an input argument for the program instruction generated so as to represent the desired immediate value.

If the determination at steps 50 and 54 are that the immediate value cannot be provided from the non-volatile storage 18, then step 58 serves to compile the program instruction from the high level language as output program instructions that load the necessary immediate value from the memory 6 into a register in the register file 14 and then use that register value as an input argument in the desired processing operation.

Figure 9:
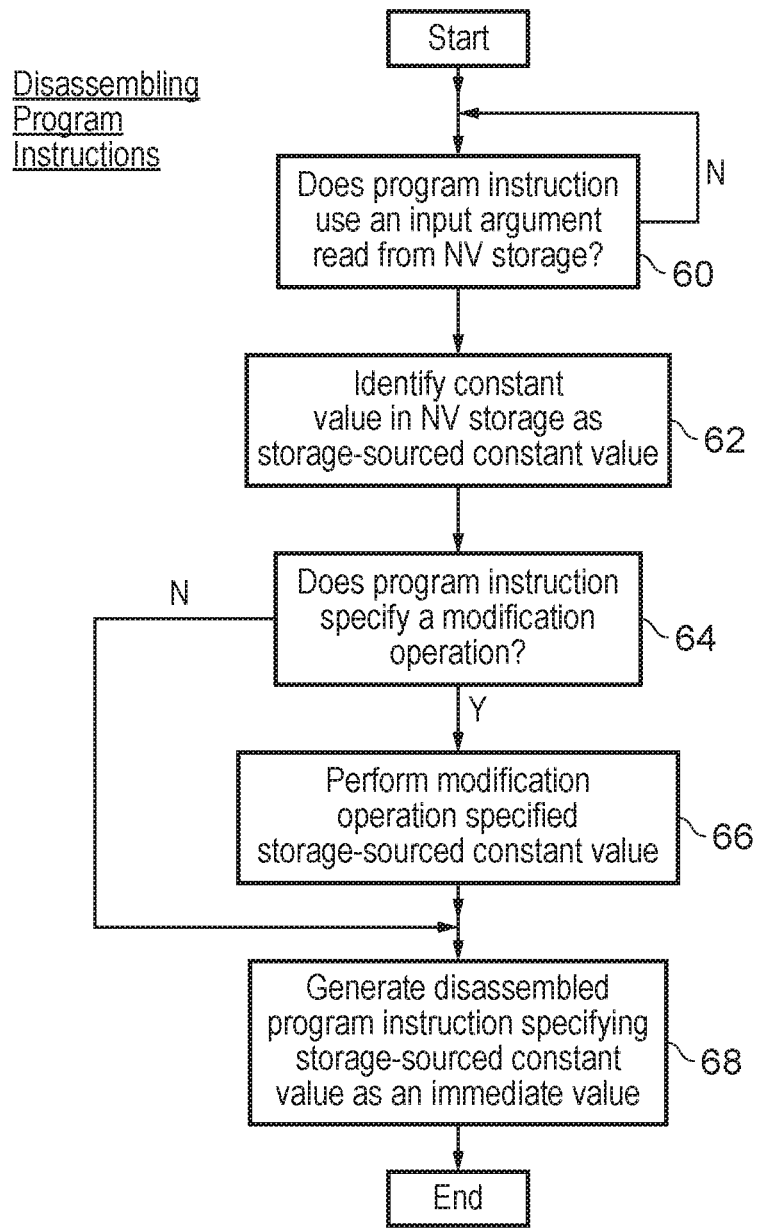
FIG. 9 is a flow diagram schematically illustrating the disassembling of program instructions.

FIG. 9 is a flow diagram schematically illustrating the dissembling of program instructions which support the above described techniques of using constant values stored within non-volatile storage 18 both directly and in modified form. Step 60 determines whether a program instruction to be dissembled uses an input argument read from non-volatile storage 18. When such an instruction is identified, then step 62 serves to identify the constant value specified with the program instruction as a storage-source constant value from within the non-volatile storage 18. Step 64 then determines whether the program instruction being dissembled specifies a modification operation to be performed upon that storage-source constant value. If such a modification operation is specified, then step 66 serves to perform this operation on the specified storage-source constant value as identified within the non-volatile storage 18 to generate the immediate value which is being represented. If no such modification operation is specified, then step 66 is bypassed. Step 68 serves to generate the dissembled program instruction specifying a storage-source constant value as an immediate value within the dissembled program instruction output of the dissembling process.

Both the compilation process of FIG. 8 and the dissembling process of FIG. 9 require the underlying algorithms to be provided with information identifying what are the constant values stored within the non-volatile storage 18 of the target processor for the program instructions being compiled or for the program instructions being dissembled. The constant values stored may differ between different target processors depending upon the particular requirements of a given target processor, e.g. the constant values stored for a general purpose processor may differ from the constant values stored for a graphics processing unit.

The table of constant values stored within the non-volatile storage 18 of one example implementation of the present techniques together with the modification operations supported by this example implementation are described further below. It will be appreciated that this is only an example of a table of constant values and a set of modification operations which may be supported and that other embodiments of the present technique may use different constant values and different modifications The output value generated in response to a constant-using program instruction as discussed above is equal to that given by reading the one or more constant values from the non-volatile storage 18, optionally modifying that read constant value using a specified modification operation, and then performing the processing operation specified by the program instruction upon the constant value or the modified constant value. It will be appreciated that in practice these particular steps, either in the above order or in a different order, need not be performed by a particular implementation providing that the output value which is generated is equal to that which would have been produced should these steps have been performed in the above described manner. It will be appreciated that in practice a given modification operation and processing operation may be dividing to many different separate steps which could be re-ordered or changed and yet still produce an output value which is the same as if the above specified steps have been performed in the specified order. The present techniques encompass such variations.

The constant values and modification circuitry provided in the example described below use of modifiers to extend the range of available constant values.

Not all modifiers are available on all arguments, so the set of constants available may be different for different instructions, or even for different arguments on the same instruction. The compiler or assembler must therefore search for legal values independently for each input.

The modifiers have the following properties:
Full-width values are stored when values absolutely must be available regardless of modifier, such as 0 or 1.0f (32-bit floating-point value for 1.0).
Positive byte lane values can be widened identically to signed or unsigned 32-bit integer values.
Negative byte lane values can be widened to unsigned or signed 32-bit integer values with different results.
Some byte-lane pairs can be widened to a pair of 16-bit integers.
Positive halfword lane values can be widened identically to signed or unsigned 32-bit integer values
Negative halfword lane values can be widened to unsigned or signed 32-bit integer values with different results.
Half lanes select from packed pairs of 16-bit floating point values can be widened to 32-bit floating point values accurately in most cases.
Full-width 32-bit floating point values are stored where values would be inaccurate when widened.
Swizzles applied to packed pairs of 16-bit floating point values stored as {0,X} allow {X,0} and {X,X} to also be synthesized.
The negation modifier can be applied to floating-point values as well as swizzles or widening.

Most values have been chosen and packed deliberately, but several values are also coincidentally present within other, non-packed values. Their use is valid, but where a deliberately packed value is also available, it should be used instead.

Probable examples include:
0x0000003F (63) is available from the top byte of the representation of 1.0f, with integer widening.
0x00000040 (64) is available from the top byte of the 16-bit floating point value 2.0f, with integer widening.
0x00000080 (128) is available from byte 2 of the representation of 1.0f, with unsigned integer widening.
0xFFFFFF80(−128) is available from byte 2 of the representation of 1.0f, with signed integer widening.

The selection of values for inclusion in the nonvolatile storage is dependent on the available modifiers, their availability on different instructions, and analysis of the processor workload.

Examples of Values Likely to be Selected Include:
Bit pattern Meaning
0x00000000 Zero, in all data formats
0xFFFFFFFF Integer −1
0x7FFFFFFF Maximum signed 32-bit integer value, also represents packed 16-bit integer values {−1, maximum signed 16-bit integer value}.
0x03020100 And similar values—small positive integers packed as bytes
0xFBFCFDFE And similar values—small negative integers packed as bytes
0x80002000 And similar values—packed 16-bit integer pairs {0x2000, 0x8000}
0x3F800000 1.0f, stored as 32-bit floating point so it is universally available.
0x3EA2F983 1.0f/PI, stored as 32-bit floating point for accuracy.
0x477FFF00 65535.0f, stored as 32-bit floating point for range
0x5C005BF8 {255.0f, 256.0f} stored as a pair of 16-bit floating point values
0x3C000000 {0.0f, 1.0f} stored as a pair packed 16-bit floating point values. Also coincidentally $2_{-7}$ as a 32-bit floating point value.
0x40000000 {0.0f, 2.0f} and similar values, stored as a pair packed 16-bit floating point values. Also coincidentally 2.0f as a 32-bit floating point value.

32-bit registers
In a 32-bit instruction, each register can be accessed individually as r0 to r63. The 32-bit registers may also be subdivided into smaller lanes:

| Data type | Lane designator | Bits | Description |
|---|---|---|---|
| v2i16, v2f16 | h0 | [15:0] | Halfword 0 |
| | h1 | [31:16] | Halfword 1 |
| v4i8 | b0 | [7:0] | Byte 0 |
| | b1 | [15:8] | Byte 1 |
| | b2 | [23:16] | Byte 2 |
| | b3 | [31:24] | Byte 3 |

SIMD operations on 32-bit registers
So, for example, the high word of register r13 would be r13.h1, and the highest byte of register r20 would be r20.b3.
Modifiers:
Integers and vectors of integers (U=unsigned, S=signed)
U32.widen: .h0, .h1, .b0, .b1, .b2, .b3
S32.widen: .h0, .h1, .b0, .b1, .b2, .b3

V2U16.swz: .h00, .h01, .h10, .h11, .b00, .b02, .b20, .b22, .b11, .b13, .b31, .b33, .b01, .b23
V2S16.swz: .h00, .h01, .h10, .h11, .b00, .b02, .b20, .b22, .b11, .b13, .b31, .b33, .b01, .b23
V4U8.lanes: .b0123, .b3210, .b0101, .b2323, b0000, .b1111, .b2222, .b3333, .b2301, .b1032, .b0011, .b2233

Figure 10:
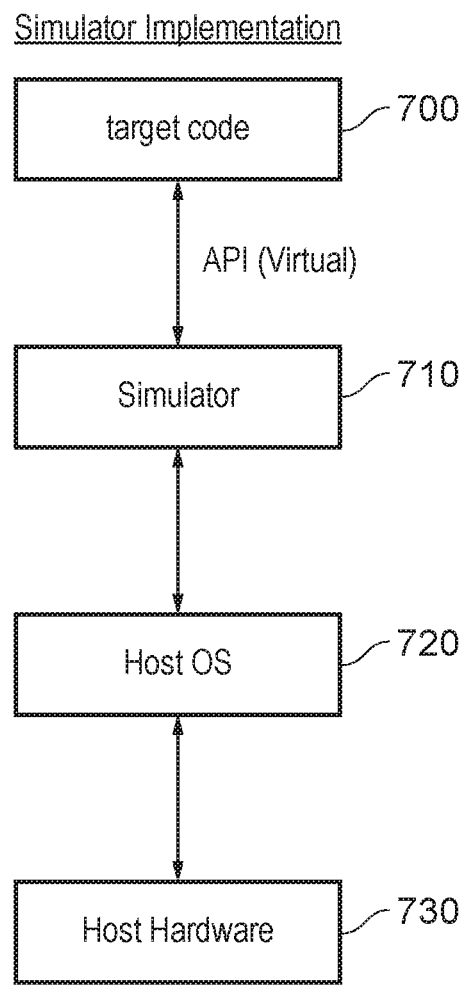
FIG. 10 schematically illustrate a virtual machine implementation of the above described techniques.

Floating point and vectors of floating point:
F32.widen: .h0, .h1
V2F16.swz: .h00, .h01, .h10, .h11
F32/V2F16: .neg, .abs FIG. 10 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 730, optionally running a host operating system 720, supporting the simulator program 710. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 730), some simulated embodiments may make use of the host hardware, where suitable.

The simulator program 710 may be stored on a computer-readable storage medium (which may be a non-transitory medium), and provides a program interface (instruction execution environment) to the target code 700 (which may include applications, operating systems and a hypervisor) which is the same as the application program interface of the hardware architecture being modeled by the simulator program 710. Thus, the program instructions of the target code 700, including the constant-using program instructions described above, may be executed from within the instruction execution environment using the simulator program 710, so that a host computer 730 which does not actually have the hardware features of the apparatus 2 discussed above can emulate these features.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
a read-only memory to store one or more constant values;
processing circuitry to perform processing operations specified by program instructions; and
an instruction decoder to decode said program instructions to generate control signals to control said processing circuitry to perform said processing operations; wherein
said instruction decoder is responsive to a constant-using program instruction having one or more operation specifying fields specifying a processing operation and one or more argument specifying fields specifying one or more input arguments to said processing operation to generate control signals to control said processing circuitry to generate an output value equal to that given by the steps of:
reading one or more constant values from said read-only memory, the one or more constant values comprising at least one N bit value;
modifying said one or more constant values using one or more modification operations at least partially specified by said one or more argument specifying fields to form one or more modified constant values comprising at least a different N bit value;
wherein the one or more modification operations alter one or more bits of the N bit value to produce the different N bit value; and
performing said processing operation using said one or more modified constant values comprising the different N bit value as one or more of said one or more input arguments to generate said output value;
wherein the constant-using program instruction comprises a modification operation field specifying the one or more modification operations from among a plurality of supported modification operations, the one or more modification operations to be performed to produce, from the one or more constant values, the one or more input arguments.

2. Apparatus as claimed in claim 1, wherein said processing circuitry comprises modifying circuitry to receive one or more values and to generate said one or more modified values.

3. Apparatus as claimed in claim 2, comprising volatile storage to store one or more variable data values and wherein said modifying circuitry is coupled to said volatile storage to receive said one or more variable data values and to generate one or more modified variable data values to be subject to processing by said processing circuitry.

4. Apparatus as claimed in claim 3, wherein said volatile storage comprises one or more of:
a volatile memory to store variable data values; and
a register file to store register values.

5. Apparatus as claimed in claim 1, wherein said one or more modification operations are at least partially specified by said one or more operation specifying fields.

6. Apparatus as claimed in claim 5, wherein said operation specifying fields specify a numeric type of said one or more input arguments among a plurality of numeric types and said one or more manipulation operations are selected in dependence upon said numeric type and said one or more argument specifying fields.

7. Apparatus as claimed in claimed in claim 6, wherein said plurality of numeric types include:
integer arguments;
floating point arguments;
byte length arguments;
half word length arguments; and
full word length arguments.

8. Apparatus as claimed in claim 2, wherein said processing circuitry comprises arithmetic and logic circuitry to perform said processing operation and said modifying circuitry is discrete from and supplies said one or more modified values to said arithmetic and logic circuitry.

9. Apparatus as claimed in claim 2, wherein said processing circuitry comprises arithmetic and logic circuitry to perform said processing operation and said modifying circuitry is fused with said arithmetic and logic circuitry to perform said one or more modification operations and said processing operation as a fused operation.

10. Apparatus as claimed in claim 1, wherein said supported modification operations include one or more of:
byte selection from within a constant value;
half word selection from within a constant value;
widening of a selected portion of a constant value;
sign reversal of a constant value;
taking an absolute value of a constant value; and
performing a swizzle operation upon one or more selected portions of a constant value.

11. Apparatus as claimed in claim 1, wherein said read-only memory, said processing circuitry, and said instruction decoder are part of one of:
a general purpose processor; and
a graphics processing unit.

12. Apparatus for processing data comprising:
a read-only memory for storing one or more constant values;
processing means for performing processing operations specified by program instructions; and
instruction decoding means for decoding said program instructions to generate control signals to control said processing means to perform said processing operations; wherein
said instruction decoding means is responsive to a constant-using program instruction having one or more operation specifying fields specifying a processing operation and one or more argument specifying fields specifying one or more input arguments to said processing operation to generate control signals to control said processing means to generate an output value equal to that given by the steps of:
reading one or more constant values from said read-only memory, the one or more constant values comprising at least one N bit value;
modifying said one or more constant values using one or more modification operations at least partially specified by said one or more argument specifying fields to form one or more modified constant values comprising at least a different N bit value;
wherein the one or more modification operations alter one or more bits of the N bit value to produce the different N bit value; and
performing said processing operation using said one or more modified constant values comprising the different N bit value as one or more of said one or more input arguments to generate said output value;
wherein the constant-using program instruction comprises a modification operation field specifying the one or more modification operations from among a plurality of supported modification operations, the one or more modification operations to be performed to produce, from the one or more constant values, the one or more input arguments.

13. A method of processing data comprising the steps of:
storing one or more constant values within read-only memory;
performing processing operations specified by program instructions using processing circuitry; and
decoding said program instructions to generate control signals to control said processing circuitry to perform said processing operations; wherein
in response to a constant-using program instruction having one or more operation specifying fields specifying a processing operation and one or more argument specifying fields specifying one or more input arguments to said processing operation, generating control signals to control said processing circuitry to generate an output value equal to that given by the steps of:
reading one or more constant values from said read-only memory, the one or more constant values comprising at least one N bit value;
modifying said one or more constant values using one or more modification operations at least partially specified by said one or more argument specifying fields to form one or more modified constant values comprising at least a different N bit value; and
wherein the one or more modification operations alter one or more bits of the N bit value to produce the different N bit value;
performing said processing operation using said one or more modified constant values comprising the different N bit value as one or more of said one or more input arguments to generate said output value;
wherein the constant-using program instruction comprises a modification operation field specifying the one or more modification operations from among a plurality of supported modification operations, the one or more modification operations to be performed to produce, from the one or more constant values, the one or more input arguments.

14. A method of compiling program instructions to be executed by a target processing apparatus comprising the steps of:
identifying an input argument of a processing operation that is a constant value;
determining if said constant value can be provided as a storage-sourced constant value by one of:

a constant value stored within read-only memory of said target processing apparatus; and a constant value comprising an N bit value stored within said read-only memory and subject to one of a plurality of predetermined modification operations supported by modifying circuitry of said target processing apparatus, wherein the supported modification operations alter one or more bits of the N bit value to produce a different N bit value as the one or more input arguments; and when constant value can be provided as a storage-sourced constant value, including within said program instructions one or more program instructions using said storage-sourced constant value as said input argument.

15. A method of disassembling program instructions to be executed by a target processing apparatus comprising the steps of:

identifying a program instruction using as an input argument a constant value provided as a storage-sourced constant value by one of:

a constant value stored within read-only memory of said target processing apparatus; and a constant value comprising an N bit value stored within said read-only memory and subject to one of a plurality of predetermined modification operations supported by modifying circuitry of said target processing apparatus, and wherein the supported modification operations alter one or more bits of the N bit value to produce a different N bit value as the one or more input arguments; and when constant value is provided as a storage-sourced constant value, dissembling said program instruction to a form specifying said storage-sourced constant value as an immediate value.

16. A virtual machine computer program stored on a non-transitory storage medium to control a computer to provide an execution environment corresponding to an apparatus as claimed in claim 1.

* * * * *